(12) United States Patent
Bernhardt et al.

(10) Patent No.: US 7,029,059 B2
(45) Date of Patent: Apr. 18, 2006

(54) VEHICLE CAB MOUNTING SYSTEM

(75) Inventors: Gerd Bernhardt, Hanichen (DE); Ruslan Rudik, Dresden (DE); Sergiy Fedotov, Dresden (DE)

(73) Assignee: Deere & Company, Moline, IL (US)

( * ) Notice: Subject to any disclaimer, the term of this patent is extended or adjusted under 35 U.S.C. 154(b) by 330 days.

(21) Appl. No.: 10/623,143

(22) Filed: Jul. 18, 2003

(65) Prior Publication Data

US 2005/0051373 A1 Mar. 10, 2005

(30) Foreign Application Priority Data

Jul. 19, 2002 (DE) ................... 102 32 909

(51) Int. Cl.
*B62D 33/06* (2006.01)
(52) U.S. Cl. .............................. 296/190.07; 296/190.05
(58) Field of Classification Search ........... 296/190.01, 296/190.04, 190.05, 190.07; 180/89.2, 89.13, 180/89.14, 89.15
See application file for complete search history.

(56) References Cited

U.S. PATENT DOCUMENTS

| 4,265,328 | A | 5/1981 | Rowa et al. ............. 180/89.13 |
| 6,273,203 | B1 | 8/2001 | Paggi et al. .................. 180/89 |
| 6,581,695 | B1 * | 6/2003 | Bernhardt et al. ........... 172/439 |
| 6,726,272 | B1 * | 4/2004 | Puterbaugh et al. ... 296/190.01 |
| 6,898,501 | B1 * | 5/2005 | Schubert .................. 180/89.12 |

FOREIGN PATENT DOCUMENTS

| DE | 27 08 477 | 8/1978 |
| DE | 197 20 049 A1 | 11/1998 |
| EP | 0 273 796 B1 | 7/1988 |

OTHER PUBLICATIONS

"Kinematik and Robotik" of Manfred Husty et al, Axel Springer-Verlag-Berlin, Heidelberg, New York, 1997, pp. 491-524, ISBN 3-540-63181.
American Society of Agricultural Engineers, Paper No. 82-1610. Off-Road Vehicle Simulation for Human Factors Research.

* cited by examiner

*Primary Examiner*—Jason Morrow

(57) ABSTRACT

A vibration-damping and oscillation-damping mounting system adjustably supports a vehicle cab on a vehicle chassis. The mounting system includes a plurality of variable-length links in the form of spring-damping elements (shock-absorbing elements) and/or adjusting elements. Preferably, the cab is supported on the vehicle chassis by at least six links, each having a first end coupled to the chassis and a second end coupled to the cab. The links are arranged in closed kinematic chains and with adjacent pairs of links arranged with convergently oriented axes so that active and/or passive shock absorption (spring damping) of the cab in six degrees of freedom is possible.

13 Claims, 7 Drawing Sheets

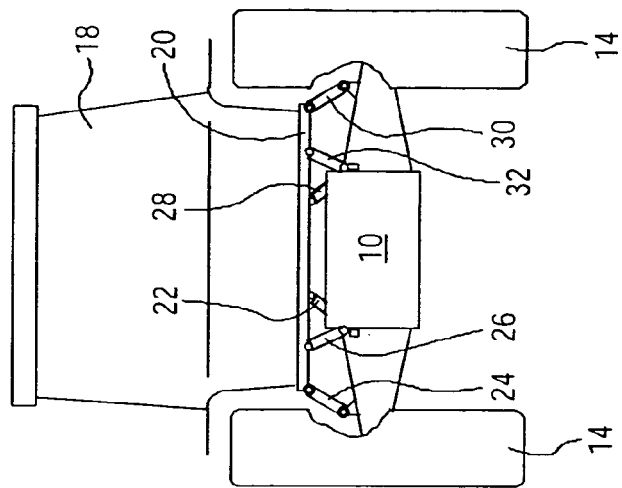
Fig.3
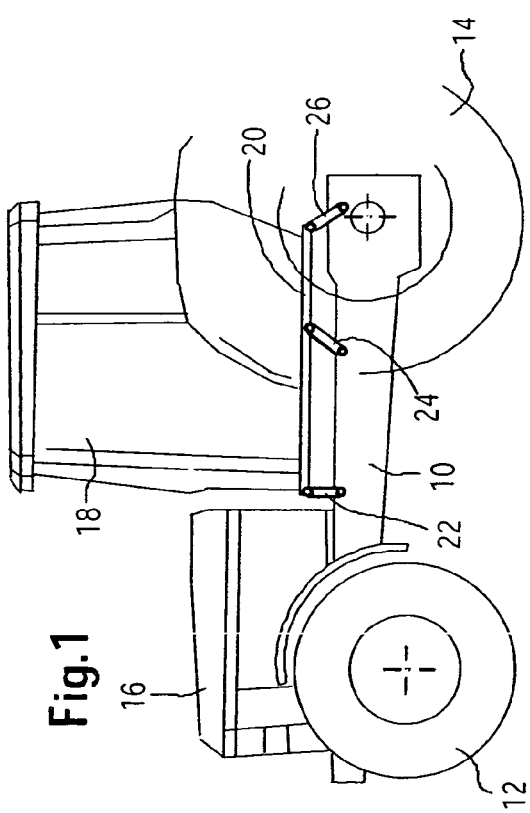
Fig.1
Fig.2

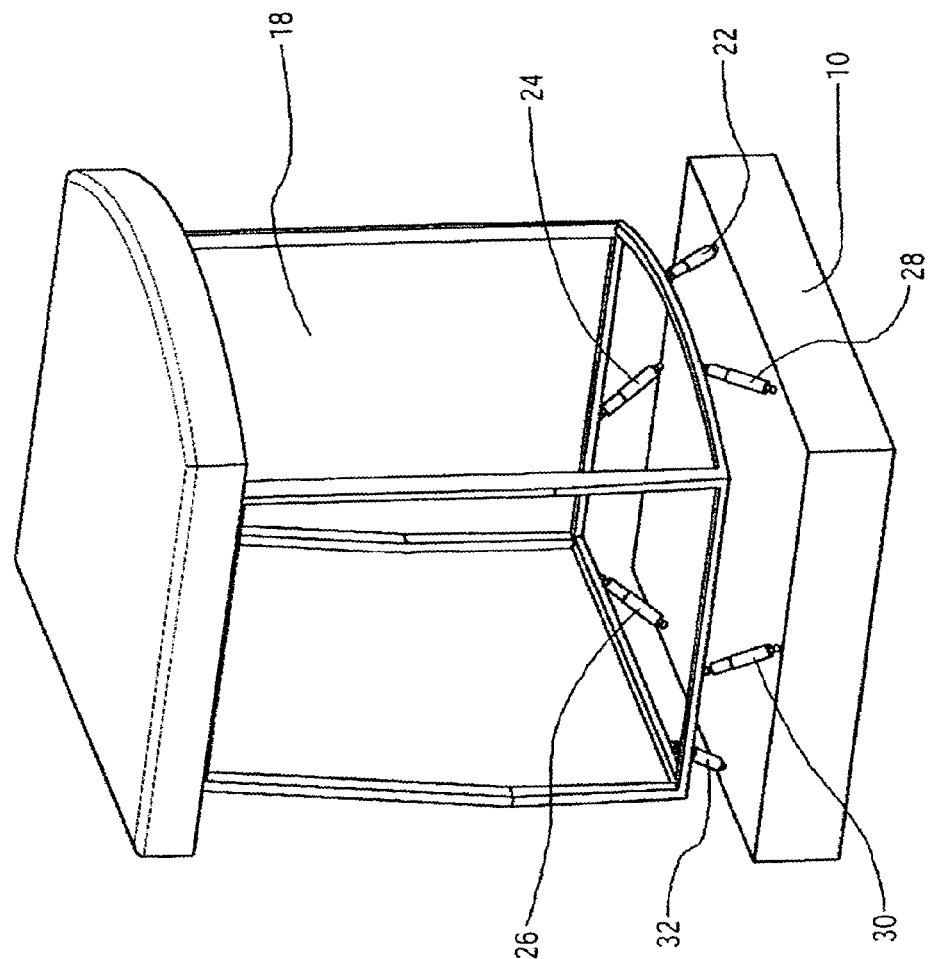

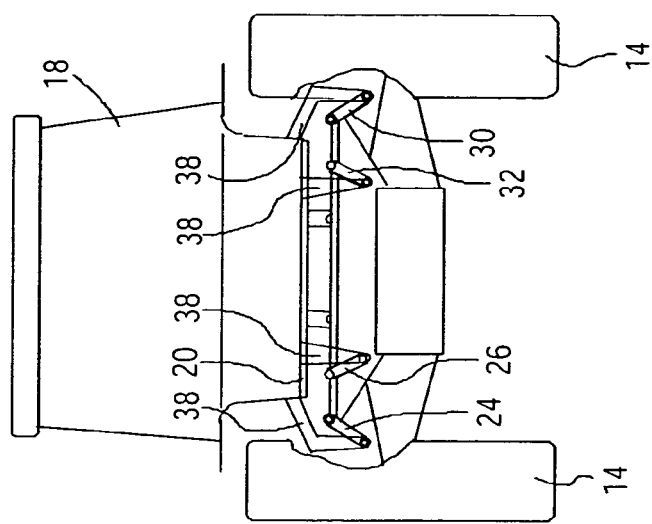
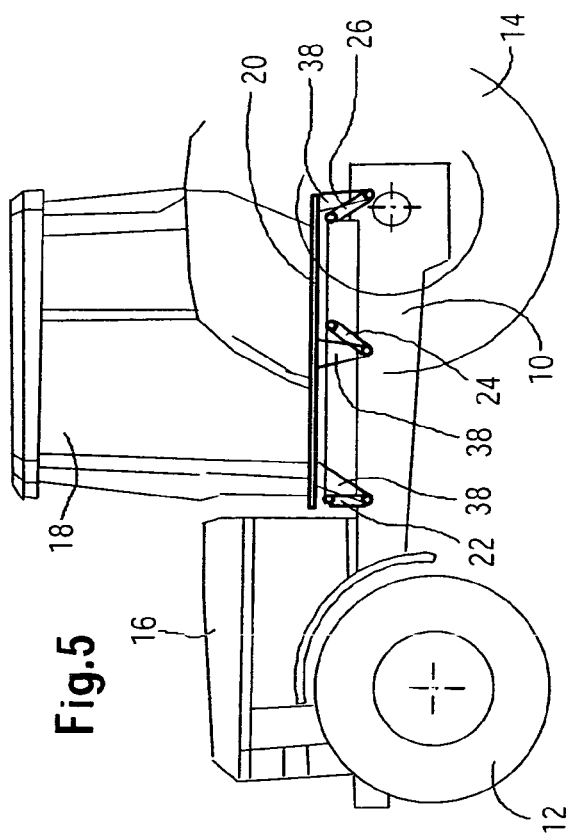
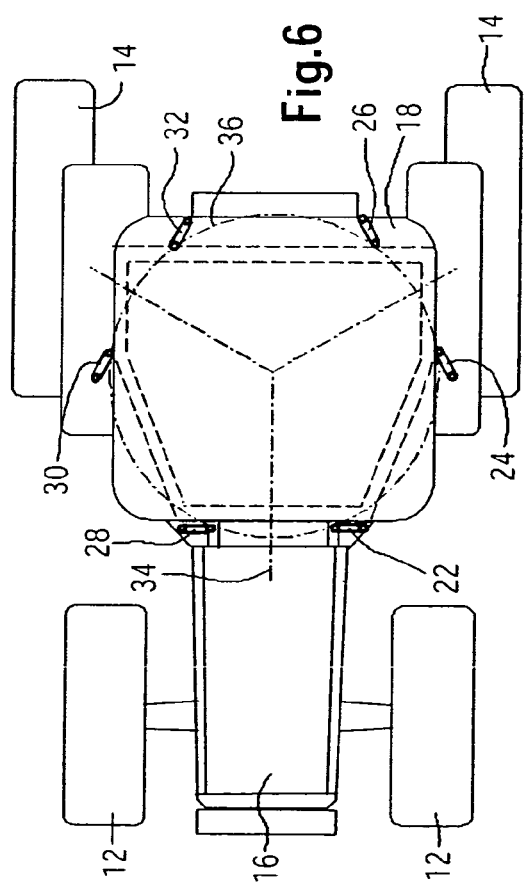

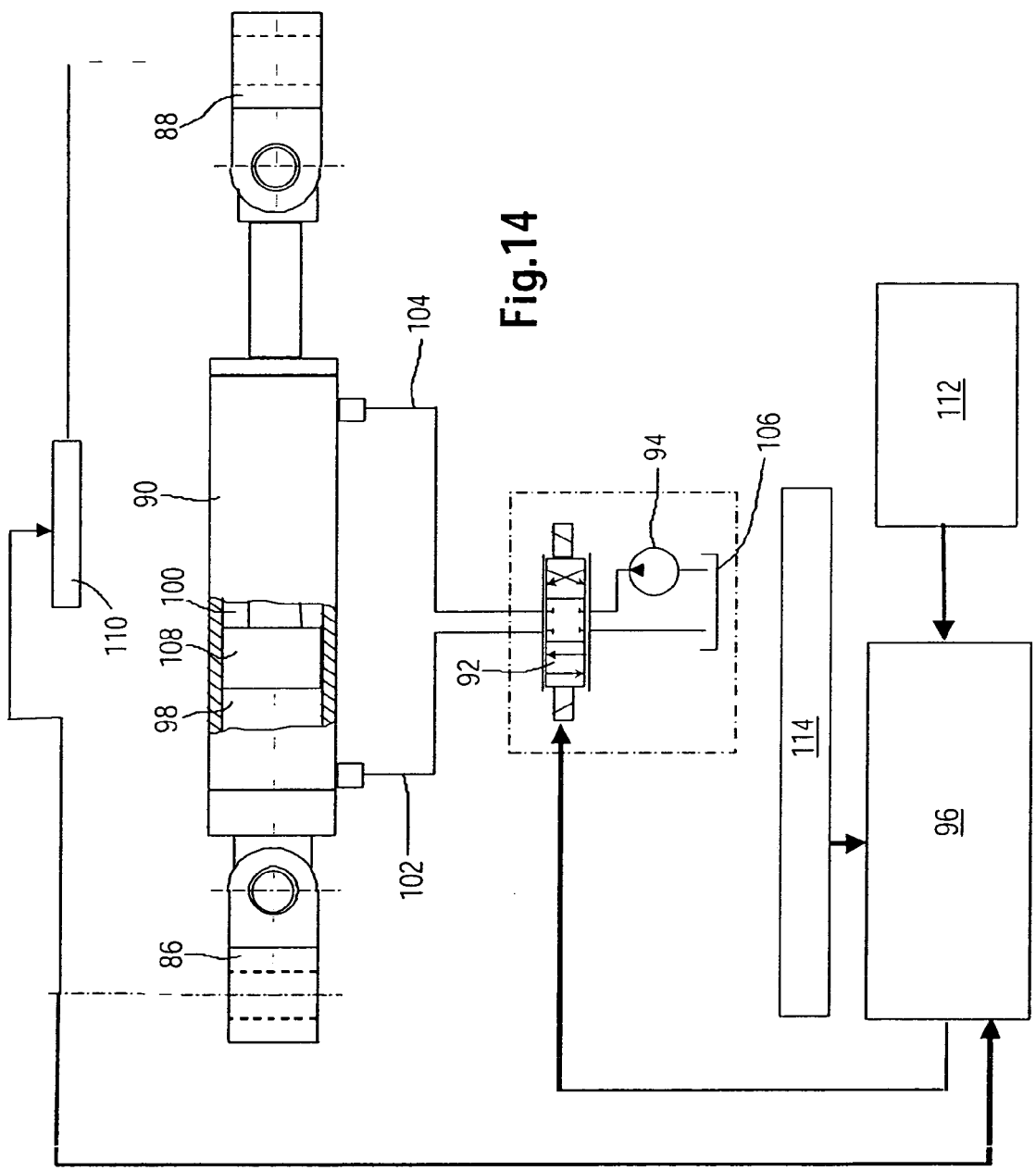

VEHICLE CAB MOUNTING SYSTEM

BACKGROUND

The present invention relates to a mounting system for vibration-damped (and oscillation-damped) support of a vehicle cab on a vehicle chassis.

Spring-loaded cab mountings serve to isolate and dampen oscillations and vibrations which originate from the roadway or other ground over which the vehicle travels, or from the drive train. The objectives of such damping are to improve the safety and comfort of the vehicle operator, and to avoid fatigue [(to the person or to materials)]. A number of spring-loaded cab mounting systems are known. E.g., elastic rubber dampers may be provided for absorbing external shocks. Essentially vertically oriented shock absorbers and coil springs are used to bolster comfort, with lateral stabilization provided by link rods disposed between the cab and the vehicle chassis (EP A 0,273,796).

In U.S. Pat. No. 6,273,203, an agricultural machine is described wherein shock-absorbing means (spring-loaded means) are disposed between the vehicle frame and the vehicle cab, which means comprise a plurality of vertically oriented hydraulic cylinders which are controllable in response to signals representing the angle of inclination, so as to tilt the cab relatively to the roadway, and to maintain the cab horizontal when the vehicle is traveling over hilly terrain. Elastic mounting elements are provided between the hydraulic cylinders and the vehicle cab, to dampen vibrations of medium and high frequency. The [(these)] elastic means are unsuitable to dampen horizontal oscillations.

DE A 27 08 477 discloses a spring-loaded system for the operator's cab of a truck or the like, which system supports the cab with respect to a vehicle frame. The cab is supported with respect to the frame by means of two pairs of lifting spring elements which engage the four corners of the cab, which springs are adjusted such that their lines of action mutually intersect pairwise in a transverse axis which extends at eye level of the occupants. In this way, the lifting spring elements mutually intersect [sic—i.e. their axes mutually intersect] pairwise in vertical longitudinal planes which pass through their articulation points. Of another configuration described in DE A 27 08 477, the lifting spring elements are adjusted such that their lines of action all intersect at the center of gravity of the operator's cab. The lifting spring elements serve essentially to vertically support the cab. To provide support in the horizontal longitudinal direction of the vehicle, a total of four springs are employed which on one side are supported against the cab and on the other side are applied to two articulation points of coupling spring elements which are fixed to the vehicle frame. Similarly, four additional springs provide support in the horizontal transverse direction of the vehicle. Thus for support of the cab in all three directions, twelve springs are needed. This entails substantial fabrication cost. Elements for damping of the oscillation movements are not described in DE A 27 08 477.

SUMMARY

Accordingly, an object of this invention is to provide a cab mounting of the general type described above with improved spring properties must be improved, at low cost.

A further object of the invention is to provide such a mounting which enables spring-loading of the vehicle cab on all axes, and which enables a thorough and uniform remediation ("cutoff") of oscillations and vibrations.

These and other objects are achieved by the present invention, wherein a cab mounting supports a vehicle cab on a vehicle chassis or frame, with damping and or extinction of vibrations and oscillations, and/or with adjustable support. The mounting includes a plurality of variable-length links in the form of spring-damping elements (shock-absorbing elements) and/or adjusting elements. The cab is supported on the vehicle chassis via at least six links. Each link has a first end pivotably coupled to the chassis and a second end pivotably coupled to the cab. The links are disposed in three closed kinematic chains and adjacent pairs of links are arranged with convergently oriented axes. With this system active and/or passive shock absorption (spring damping) of the cab in six degrees of freedom is possible.

The theoretical basis of such a system is described by Karger, Adolf, Sachs, Hans, and Steinhilper, Waldemar, 1997, in "Kinematik und Robotik" (Kinematics and robotics), pub. Springer-Verlag (Berlin, Heidelberg, and New York), pp. 491–524, ISBN 3-540-63181. A closed kinematic chain is a transmission mechanism comprised of members (legs) and pivots, wherein the chain end points are pivotably connected to a common base body. In the present case, preferably a closed kinematic chain is formed by a given group of two links wherein one end of each such connecting element is pivotably connected to the vehicle frame (base body) and the other end is pivotably connected to the vehicle cab, and the two links mutually include an angle [(planar angle)] between them.

The variable-length links are preferably shock-absorbing or spring-damping elements. For adjustable support of the vehicle cab, one may also employ links the length of which can be actively adjusted.

Preferably three of such chains are provided. The links of a chain are not mutually perpendicular and not mutually parallel, but form a certain angle with the horizontal and a certain mutual included angle. This arrangement of the links makes it possible to mutually isolate various movement and vibration (or oscillation) components, i.e. to de-couple them from a technical spring and oscillation standpoint. For the various movement and vibration (or oscillation) components, respective suitable spring and oscillation properties of the elastic cab mounting can be set up. Different spring properties can be associated with different types of movements, such as i) rocking (pitching) movements which occur in the event of braking or acceleration, ii) rising, sinking, and translational shaking movements which occur when traveling over unevennesses in the road or terrain, and iii) rotational movements around the cab axes. The stiffness of the system can be generally the same in the vertical direction and in the horizontal directions.

The links of a closed chain converge. The axes of the links of different closed chains preferably intersect in different convergence points. It is advantageous if these convergence points form two triangles, wherein the center of gravity of the cab or the eye level of the operator is disposed between the triangles. This enables one to limit vertical shaking movements and to improve riding comfort. This convergence is particularly advantageous in the event of passive shock absorption (passive spring-loading). When active shock absorption is employed, a corresponding compensation can be effected by active control means. Thus with active control means the convergence criterion is of little importance.

In addition to the length-adjustable links, the system may also include rigid links between the vehicle chassis and the vehicle cab, in order to stabilize the configuration. But, this reduces the degrees of freedom of the movement.

The cab may be stabilized with respect to tilting by additional means, such as chains of mechanical elements near each shock-absorbing leg. Such measures will not affect the degrees of freedom. Therefore, it is of particular advantage if the vehicle cab is supported against (or on) the vehicle chassis exclusively by adjustable length links. This enables unconstrained three-dimensional elimination of vibrations and oscillation, and unconstrained three-dimensional adjustment of the cab.

The links are preferably disposed in a hexapod arrangement. A "hexapod" is understood to be a particular arrangement of six length-adjustable links (legs) such as described in connection with the method of controlling a motorized coordinate measurement apparatus in DE A 197 20 049; and in connection with the description of robot kinematics in the industry journal Maschinenmarkt (Machinery market) (Wüjrzburg), 1999, vol. 105, issue 21, p. 44.

Depending on the choice of the geometric parameters of the hexapod (i.e. depending on the dimensions, separations, and angles between the links in the form of shock-absorbing elements), the elasticity of the support can be adjusted. The farther the shock-absorbing element is swung away from the vertical, the lower is its spring stiffness in the vertical direction and the higher is its spring stiffness in the particular horizontal direction in which the shock-absorbing element is inclined.

Also, the choice of the frame-side and cab-side engagement points of the links is of great importance for the spring-loading properties. The engagement points must be adjusted to the given application situation. It is advantageous if the engagement points are provided at the vertices of geometric figures (such as triangle, rectangle, trapezoid, or hexagon). A preferred geometric figure is the hexagon, which need not be an equilateral hexagon. The engagement points may also lie on circles. In order to ensure identical behavior on the two sides of the vehicle, the arrangement of the engagement points should be symmetrical with respect to the longitudinal axis of the vehicle. The pivot points of the links on the cab side or the frame side may lie in a plane, but such an arrangement in a single plane is not strictly necessary, however.

The links are preferably arranged so that they are only subjected to compressive forces or only to tensile forces. They are adjustable only along their longitudinal line of action, and are rigid in the transverse direction, or yield only slightly. Thus, no appreciable spring displacement or adjustment (of a given connecting element) is possible transversely to the longitudinal line of action of the connecting element.

The links can be so disposed between frame and the cab that they are compressively stressed and the cab "stands" on the links. It may also be advantageous, however, for the links to be stressed tensilely (urging extension) so that the cab "hangs" on the links.

The links may be passive components which react to external forces by changing their length. On the other hand, it may be advantageous to employ active spring-loaded (shock-absorbing) elements with lengths which are adjustable via a control device, and which actively react to vibrations and oscillations and can dampen these.

The passive links may comprise mechanical spring-and-dashpot elements representing a combination of mechanical springs and dashpots. The springs isolate medium or relatively high frequency oscillations, whereas the dashpots dampen oscillations in which kinetic energy is converted to heat energy. In such shock-absorbing systems the dashpots are preferably disposed in parallel to the springs. A conventional shock-absorbing strut with impact damper and coil spring disposed mutually concentrically, wherein the damper and spring act in parallel, can serve as a passive mechanical spring-and-dashpot element. Spring-and-dashpot elements in the form of hydro-pneumatic shock absorbers may also be used. These may employ a hydraulic cylinder and a pressure reservoir. With such an arrangement, the damping characteristics can be regulated by throttles. A fixed throttle can be chosen for this purpose, or instead of a throttle a hydraulic valve may be employed which has adjustable throttle effects. The spring-loading characteristics can be adjusted by the choice of various pressure reservoirs depending on the desired spring-loading resistance. With the use of adjustable pressure reservoirs, the elastic compliance can be regulated by the preset pressure in the hydro-pneumatic pressure reservoir (e.g. by pre-stressing a membrane). The hydro-pneumatic spring-and-dashpot element permits control of the altitude of the cab by admission and withdrawal of the hydraulic fluid. The forms and configurations of the mechanical shock-absorbing-legs and the hydr-opneumatic elements can be similar to those of known components employed in the suspension systems of motor vehicles (see "Double handbook for machinery manufacture" [in German], 18th Edition, Springer-Verlag (Berlin, Heidelberg, New York).

Spring-and-dashpot elements having (usually) constant elastic and damping characteristics (constant spring elasticity) are selected depending on the given requirements. The desired shock-absorbency characteristics of the cab are arrived at, on the one hand, in conventional fashion, by the influence of the spring- and/or dashpot resistance forces of the spring-and-dashpot elements, and on the other hand by the geometric arrangement of the spring-and-dashpot elements which is a feature of the present invention.

The active links may comprise, e.g., hydraulic cylinders or electro-mechanical adjusting elements. In this, the use of mechanical coil springs or the like is unnecessary. Bilaterally acting hydraulic cylinders are particularly suitable for use as the hydraulic cylinders. These are actuated by control valves which are in [fluid] communication with a pressure source and which are themselves controlled by a control device. In order to dampen vibrations and oscillations, the active links are controlled based on signals from acceleration sensors. When hydraulic cylinders are used as active links, the forces acting on a given hydraulic cylinder are measured by pressure sensors, and the sensed forces are utilized in the control process. Also, the cylinder length may be sensed. The control methods which have been developed for control of hexapods may be used for the control of active links.

When active links are used, not only can vibrations and oscillations be reduced or eliminated, but the relative position of the chassis and the cab can be regulated, so as to compensate for inclined positions of the vehicle and to allow the cab to be maintained in a horizontal orientation even when the vehicle is moving over uneven terrain, e.g. on a slope. In this, the links can be adjusted either manually by the operator or automatically. In the case of automatic adjustment, one may employ inclination sensors to determine the inclination of the cab with respect to the horizontal, as described in U.S. Pat No. 6,273,203.

It is advantageous if the links are not linked directly to the cab structure but are instead linked to an intermediate frame on which the cab structure releasably rests. This facilitates the mounting of the cab on the chassis. When repairs are needed, it also enables the cab to be lifted off of the chassis without releasing the attachment points of the links.

It is particularly advantageous if the intermediate frame is connected to the cab structure with a hinge, so that the cab can be tilted with respect to the intermediate frame and thereby with respect to the chassis. This facilitates easy access to components located underneath the cab. The axis of the hinge may be in the longitudinal direction or transverse direction of the vehicle, so that the cab can be tilted laterally, forward, or backward, with respect to the vehicle.

This cab mounting system enables shock absorption for the cab in all three dimensions (all three axes), thereby substantially increasing riding comfort and providing reliable contact between the operator and the operating elements. The cab mounting enables a modular construction wherewith all of the links and possibly also the associated control elements have substantially identical form and configuration, and thereby are interchangeable. The cab mounting may include passive or active shock-absorption, and active cab height adjustment, as well as continuous maintenance of the horizontal orientation of the cab. This system may include vibration control technology for decoupling vibrations, separating them out, and otherwise remediating them.

BRIEF DESCRIPTION OF THE DRAWINGS

FIG. 1 is a side view of a tractor having a cab mounting of the invention;

FIG. 2 is a top view of the vehicle of FIG. 1;

FIG. 3 is a rear view of the vehicle of FIG. 1;

FIG. 4 is a simplified perspective view of the vehicle cab which has been mounted on the vehicle frame;

FIG. 5 is a side view of a tractor cab an alternate cab mounting system;

FIG. 6 is a top view of the system of FIG. 5;

FIG. 7 is a rear view of the system of FIG. 5;

FIG. 14 is a schematic diagram of an active hydraulic shock-absorbing leg.

DETAILED DESCRIPTION

Figure 9:
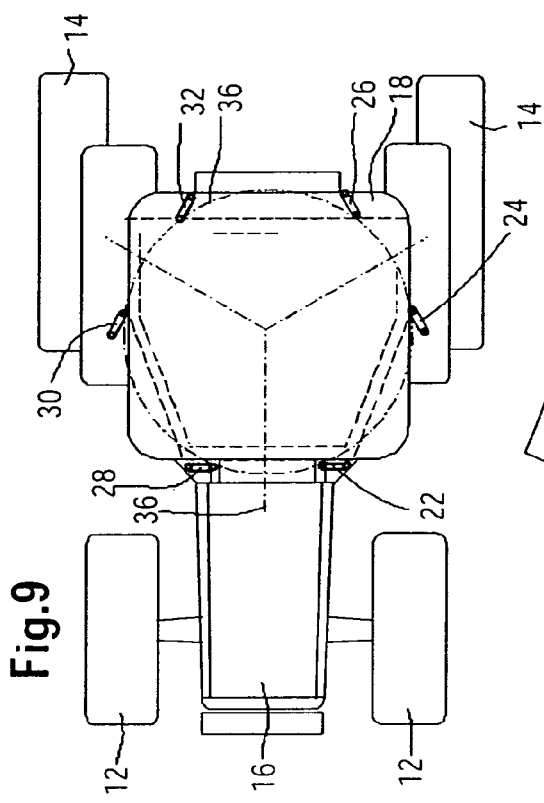
FIG. 9 is a top view of the invention of FIG. 8.

FIGS. 1 to 11 show a tractor which has a vehicle chassis 10 on which the front wheels 12 and rear wheels 14 are mounted. The vehicle chassis 10 may comprise a vehicle frame, as shown. In a tractor having a unit construction, the motor frame and transmission frame serve as the vehicle chassis. The chassis 10 bears, in the forward region of the vehicle, a drive engine and associated components, disposed under an engine hood 16. In the rear region of the vehicle, a vehicle cab 18 is disposed which is constructed on a bottom frame 20.

As seen from FIGS. 1 and 4, six connecting elements or links 22, 24, 26, 28, 30, 32 are disposed between the vehicle chassis 10 and the bottom frame 20 of the cab. The lower end of each connecting element is pivotably coupled to the chassis 10, and the upper end of each connecting element is pivotably coupled to the bottom frame 20. With this configuration, the cab 18 exerts compression forces on the links 22, 24, 26, 28, 30, 32. The links 22, 24, 26, 28, 30, 32 are preferably coupled at each end by universal joints, so that the links can swing in any direction with respect to the chassis 10 or the bottom frame 20, respectively.

As seen in FIG. 2, the links 22, 24, 26, 28, 30, 32 are symmetrically disposed with respect to the longitudinal axis 34 of the vehicle, with three links being provided on each side of the vehicle. Two of the links (22, 28) are disposed in the forward region of the cab, two (24, 30) are disposed at the sides of the cab, and two (26, 32) are disposed in the rear region of the cab. The links 22, 24, 26, 28, 30, 32 are not vertically oriented but are inclined with respect to the vertical. The lines of action (or axes) of each of the pairs of links (pairs considered as 22, 28; 24, 26; 30, 32) are oriented to form a V shape, with the apex (convergence point) of the "V" being at the top; this phenomenon is not clearly illustrated in FIGS. 1 to 4. The links 22, 24, 26, 28, 30, 32 are disposed in closed kinematic chains, particularly in a hexapod arrangement. The links 22, 24, 26, 28, 30, 32 of FIGS. 1 to 4 may be passive shock-absorbing elements or active adjusting elements.

The cab mounting shown in FIGS. 5–7 differs from the cab mounting of FIGS. 1–3, essentially in the type of cab suspension. In FIGS. 5–7, the lower ends of the links 22, 24, 26, 28, 30, 32 are pivotably coupled to downwardly projecting lugs 38 on the cab frame, and the upper ends of the links 22, 24, 26, 28, 30, 32 are pivotably coupled to the vehicle chassis. In contrast to the embodiment of FIGS. 1–4, the links 22, 24, 26, 28, 30, 32 of FIGS. 5–7 are not stressed compressively but rather they are stressed in extension.

Figure 11:
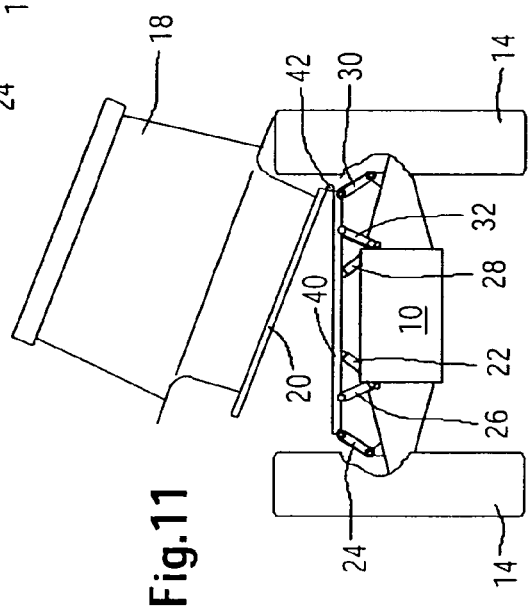
FIG. 11 is a rear view of the invention of FIG. 8, with the cab tilted.
Figure 8:
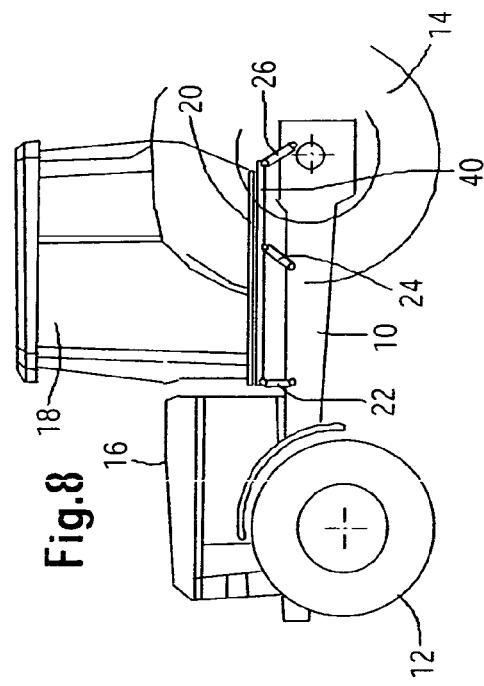
FIG. 8 is a side view of another cab mounting embodiment for a tiltable cab.
Figure 10:
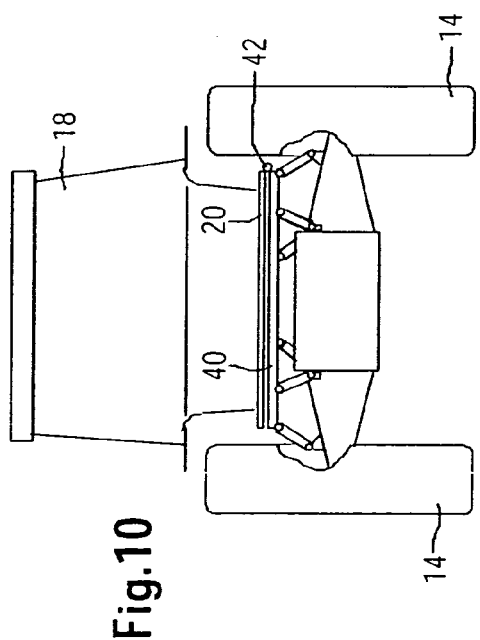
FIG. 10 is a rear view of the invention of FIG. 8.

The embodiment of FIGS. 8–11 is similar to that illustrated in FIGS. 1–3. However, in FIGS. 8–11 the upper ends of the links 22, 24, 26, 28, 30, 32 are not pivotably linked to the bottom frame 20 of the cab 18, but to a rigid intermediate frame 40. The intermediate frame 40 is connected to the bottom frame 20 via a hinge joint 42 disposed laterally and oriented in the longitudinal direction of the vehicle, so that the cab 18 can be tilted laterally from the basic position illustrated in FIG. 10 to a raised tilted position as illustrated in FIG. 11. When the vehicle cab 18 is in its basic position, the intermediate frame 40 is fixed to the bottom frame 20 via locking means (not shown). The links 22, 24, 26, 28, 30, 32 shown in FIGS. 5–7 and 8–11 may also be passive shock-absorbing elements or active adjusting elements.

Figure 12:
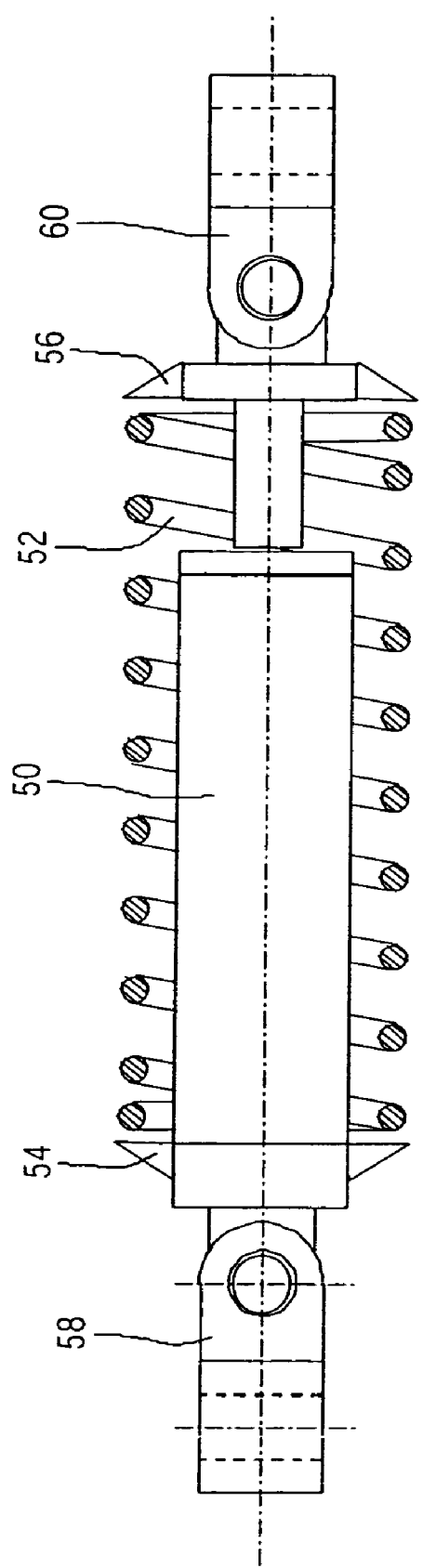
FIG. 12 is a side view of a passive mechanical-hydraulic shock-absorbing leg.

The links 22, 24, 26, 28, 30, 32 may comprise conventional passive mechanical-hydraulic shock-absorbing legs such as shown in FIG. 12. In such a device, a coil spring 52 is disposed concentrically to a dashpot element 50. The coil spring 52 is held under stress between two discs 54, 56, and functions as a compression spring, in an "upright" arrangement wherein the link is stressed compressively. For a "suspension-type" arrangement, wherein the links are stressed in extension, tensile springs are used, with their ends fixed to the discs 54, 56. At each disc 54, 56 a universal joint 58, 60 is mounted which is pivotally connected to the chassis 10, the bottom frame 20 or the intermediate frame 40. In place of the universal joints, ordinary ball joints may be used.

Figure 13:
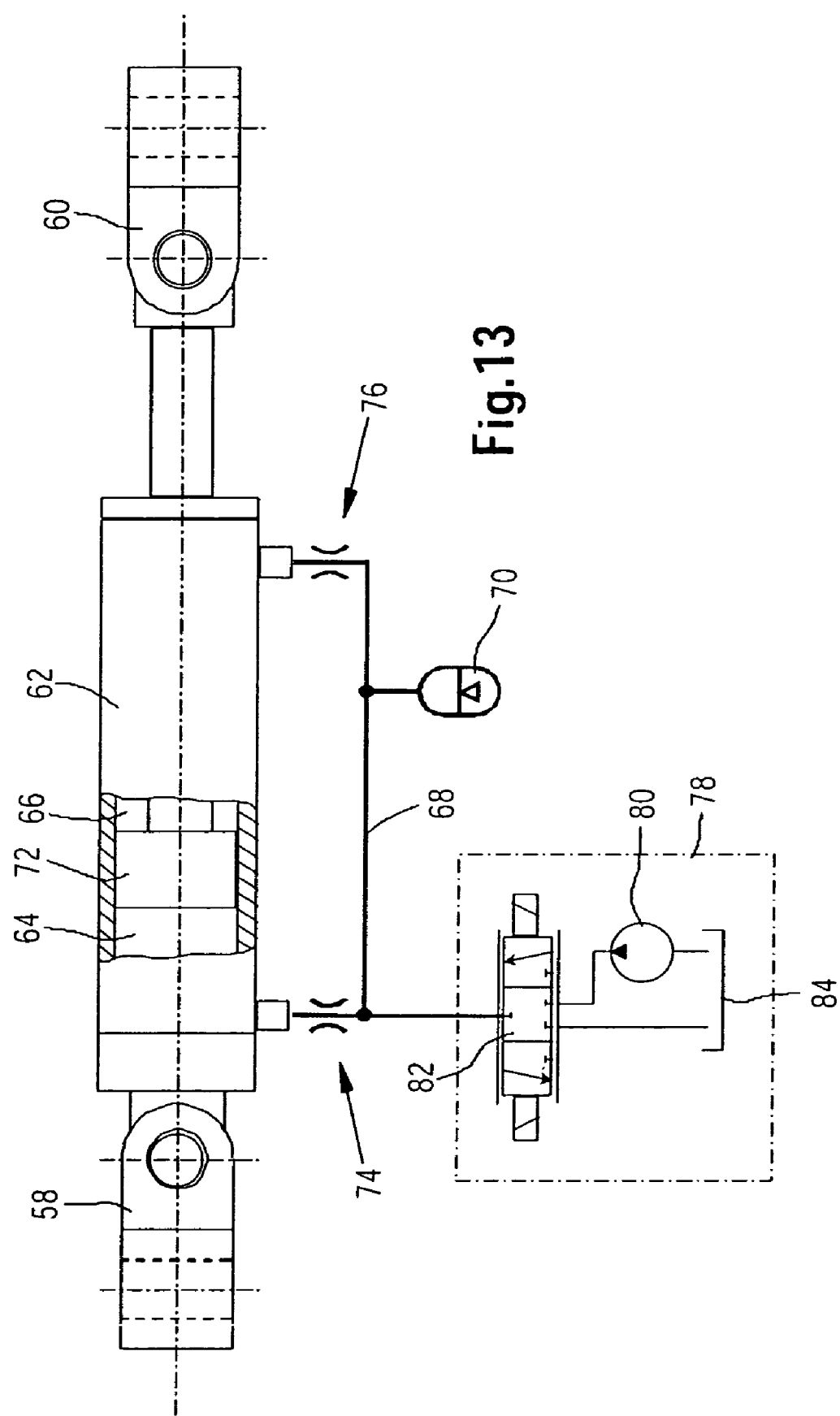
FIG. 13 is a schematic diagram a passive hydropneumatic shock-absorbing leg.

Another type of passive shock-absorbing leg, a hydropneumatic shock-absorbing leg, is shown in FIG. 13. Here a hydraulic cylinder 62 is disposed between two universal joints 58, 60. The cylinder 62 has two chambers 64, 66 which are interconnected by a line 68. A pressure reservoir 70 is connected to line 68, which enables the plunger 72 to be moved in spring-loaded fashion against the pre-stressing force of the reservoir 70, despite the difference in cross section between the plunger space 64 and the ring-shaped space 66. The line 68 includes two throttles 74, 76 which dampen the movements of the plunger 72 which are affected by the elasticity characteristics of the hydraulic system.

By selection of suitable throttles, the damping characteristics can be adjusted. Additionally, a level-setting device 78 is present in the line 68, which device essentially contains a pressure source 80 and an electromagnetically actuatable 3 position 3 way directional control valve 82. By controlling the directional control valve 82, the line 68 can be selectively connected to the a pressure source 80 or to an un-pressurized storage container 84, or closed. The directional control valve 82 can be controlled with the aid of a signal of a position sensor (not shown) which measures the distance between the cab 18 and the chassis 10, such that the cab 18 is caused to persistently occupy a middle position despite changes in the cab load, thereby continuously making the maximum possible spring-loaded excursion available. Also, by means of individual adjustment of the pressures in the hydro-pneumatic links, the cab can be horizontally adjusted.

It is also possible to utilize active shock-absorbing legs as adjusting elements, wherein the spring and damping characteristics are produced by a common control device. FIG. 14 shows an active hydraulic shock-absorbing leg, wherein the leg includes a hydraulic cylinder 90 disposed between two universal joints 86, 88, an electromagnetically controllable proportional 4 position, 3 way directional control valve 92, and a pressure source 94.

The proportional valve 92 is actuated by an electronic control device 96. The lines 102, 104 leading to the respective chambers 98, 100 of the hydraulic cylinder 90 are selectively connectable, via the proportional valve 92, to the outlet of the pressure source 94 or to an un-pressurized storage container 106, or are (selectively) hermetically closed off. In this manner the position of the plunger 108 in the hydraulic cylinder 90 can be adjusted to any position, at will.

Potentiometer type position sensors 110 associated with each adjusting element continuously measure the length of each adjusting element and thus, the relative position of the cab 18 and the vehicle frame 10. For better understanding, one such sensor 110, which measures the distance between the articulation axes of the universal joints 86, 88, is shown schematically in FIG. 14. Preferably, however, such sensors are integrated into the hydraulic cylinder 90. Also, at least one three-dimensional acceleration sensor 112 is provided which senses accelerations of the cab 18. Also, inclination sensors (not shown) may be provided. The operator can input settings via an operating device 114, to activate and deactivate the spring-loading (shock absorption) of the cab, and/or activation and deactivation of automatic suspension equalization.

The signals of the sensors 110, the acceleration sensor 112, the operating device 114, and other sensors, are evaluated or processed via a common control device 96 in order to actively counteract the accelerations of the cab 18. The control device 96 sends signals to proportional control valves 92 associated with all of the adjusting elements, to make appropriate adjustments of the hydraulic cylinders 90. When the acceleration sensor 112 disposed in the cab 18 senses an acceleration in one of the three directions, the cab 18 is adjusted in the opposite direction by the six hydraulic cylinders 90.

For example, when a leftward impact is received, the cab 18 is adjusted rightward, and when an upward impact is received, the cab 18 is adjusted downward. These adjusting movements are intended to protect the operator from suffering the full effects of the displacement resulting from the impacts. Also, pressurized reservoirs (not shown) can be connected to lines 102, 104, to facilitate gentler transitions. The position signals can be used to control the horizontal orientation of the cab (suspension equalization), when the vehicle is on inclined terrain.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A cab mounting system for supporting cab on a vehicle chassis, the mounting system having a plurality of variable-length links, characterized by:
    the cab is supported on the vehicle chassis by at least six links, each link having a first end pivotally coupled to the chassis and a second end pivotally coupled to the cab, and the links are disposed in closed kinematic chains and adjacent pairs of links having axes which converge, the mounting system absorbing shock with six degrees of freedom, and the links are arranged in a hexapod manner.

2. The cab mounting system of claim 1, wherein:
    the links have axes which converge upwardly towards a convergence point.

3. The cab mounting system of claim 1, wherein:
    all the links comprise adjustable length links.

4. The cab mounting system of claim 1, wherein:
    the links are compressed by the cab.

5. The cab mounting system of claim 1, wherein:
    the links are extended by the cab.

6. The cab mounting system of claim 1, wherein:
    at least one of the links comprises a passive shock-absorber element.

7. The cab mounting system of claim 1, wherein:
    the links are coupled to a rigid frame which is releasably connected to the cab.

8. The cab mounting system of claim 7, wherein:
    the links comprise of spring-damping elements.

9. A cab mounting system for supporting cab on a vehicle chassis, the mounting system having a plurality of variable-length links, characterized by:
    the cab is supported on the vehicle chassis by at least six links, each link having a first end pivotally coupled to the chassis and a second end pivotally coupled to the cab, and the links are disposed in closed kinematic chains and adjacent pairs of links having axes which converge, the mounting system absorbing shock with six degrees of freedom, and the length of at least one of the links is actively adjustable.

10. A cab mounting system for supporting cab on a vehicle chassis, the mounting system having a plurality of variable-length links, characterized by:
    the cab is supported on the vehicle chassis by at least six links, each link having a first end pivotally coupled to the chassis and a second end pivotally coupled to the cab, and the links are disposed in closed kinematic chains and adjacent pairs of links having axes which converge, the mounting system absorbing shock with six degrees of freedom, and at least one of the links comprises a bilaterally acting hydraulic cylinder.

11. A cab mounting system for supporting cab on a vehicle chassis, the mounting system having a plurality of variable-length links, characterized by:

the cab is supported on the vehicle chassis by at least six links, each link having a first end pivotally coupled to the chassis and a second end pivotally coupled to the cab, and the links are disposed in closed kinematic chains and adjacent pairs of links having axes which converge, the mounting system absorbing shock with six degrees of freedom, and at least one of the links comprises an electromechanical adjusting element.

12. A cab mounting system for supporting cab on a vehicle chassis, the mounting system having a plurality of variable-length links, characterized by:

the cab is supported on the vehicle chassis by at least six links, each link having a first end pivotally coupled to the chassis and a second end pivotally coupled to the cab, and the links are disposed in closed kinematic chains and adjacent pairs of links having axes which converge, the mounting system absorbing shock with six degrees of freedom; and a control unit for adjusting a length of the links to maintain a desired orientation of the cab.

13. A cab mounting system for supporting cab on a vehicle chassis, the mounting system having a plurality of variable-length links, characterized by:

the cab is supported on the vehicle chassis by at least six links, each link having a first end pivotally coupled to the chassis and a second end pivotally coupled to the cab, the links are disposed in closed kinematic chains and adjacent pairs of links having axes which converge, the mounting system absorbing shock with six degrees of freedom, the links are coupled to a rigid frame which is releasably connected to the cab, and the frame is coupled to the cab by a hinge which allows the cab to be tilted with respect to the frame.

* * * * *